United States Patent [19]
Crast et al.

[11] Patent Number: 6,018,012
[45] Date of Patent: Jan. 25, 2000

[54] TWO-COMPONENT POLYURETHANE TOP COAT FOR GOLF BALLS

[75] Inventors: Steven C. Crast; Ramon Buella Dineros, both of Oceanside, Calif.

[73] Assignee: Callaway Golf Company, Carlsbad, Calif.

[21] Appl. No.: 09/119,425

[22] Filed: Jul. 20, 1998

[51] Int. Cl.⁷ .................................................. C08G 18/79
[52] U.S. Cl. .............................. 528/73; 528/83; 524/872; 473/351; 473/371
[58] Field of Search ...................... 528/73, 83; 524/872; 473/371, 351

[56] References Cited

U.S. PATENT DOCUMENTS

| | | | |
|---|---|---|---|
| 5,409,233 | 4/1995 | Kennedy | 273/235 |
| 5,459,220 | 10/1995 | Kennedy | 528/44 |
| 5,461,109 | 10/1995 | Blair et al. | 524/839 |
| 5,494,291 | 2/1996 | Kennedy | 524/908 |
| 5,606,004 | 2/1997 | Brahm et al. | 528/73 |
| 5,820,491 | 10/1998 | Hatch et al. | 473/378 |

*Primary Examiner*—Rachel Gorr
*Attorney, Agent, or Firm*—Lyon & Lyon; Michael A. Catania

[57] ABSTRACT

A two component polyurethane top coat for use with golf balls includes a polyol component and a polyisocyanate component. The polyol component includes a polyester polyol resin containing a neopentyl glycol resin. A mixture of silane and aziridine is also preferably included in the polyol component. The polyisocyanate component includes a mixture of an isocyanate trimer of toluene diisocyanate (TDI) and a biuret of hexamethylene diisocyanate (HDI). The polyol and polyisocyanate components preferably include a two solvents forming a blend selected from the group consisting of ethyl acetate, butyl acetate, propyleneglycolmonomethylether acetate, toluene, or xylene. The coating can be applied directly to golf ball covers with a variety of chemistries without the need of a primer or basecoat. The top coat provides superior adhesion and abrasion resistance in addition to improving the drying and curing characteristics.

12 Claims, No Drawings

TWO-COMPONENT POLYURETHANE TOP COAT FOR GOLF BALLS

BACKGROUND OF THE INVENTION

The field of the invention is clear coats for use on the exterior of substrates. More specifically, the invention relates to coatings applied to the exterior of golf balls.

Clear coats are used on the exterior surfaces of a variety of substrates. Clear coats serve to enhance the aesthetic appearance of the substrate as well as act as a barrier to protect the substrate from weathering, mechanical agitation and the like. One such substrate in which clear coats are of particular importance is a golf ball.

A golf ball generally comprises a one-piece construction or it may include several layers including a core and an outer cover surrounding the core. Typically, one or more layers of paint and/or clearcoat are applied to the exterior surface of the golf ball. For example, in one typical design, the exterior surface of the golf ball is first painted with at least one clear or pigmented basecoat primer along with at least one application of a clear top coat. The basecoat and/or primer and clear top coat are applied to the golf ball to enhance the aesthetic appearance of the ball as well as mask or cover surface blemishes that may have resulted from the manufacturing process. The clear top coat is particularly important, in that the coat protects any markings, trademarks, logos, or the like that may be placed on the exterior surface of the ball.

Typically, the outer coating layers of a golf ball comprise a primer along with a clear urethane top coat. For example, U.S. Pat. No. 5,459,220 discloses a two-pack urethane top coat for a golf ball that uses separate packages of a polyol and diisocyanate that employs biurets and isocyanurate trimers of hexamethylene diisocyanate (HDI) as the crosslinking agents. U.S. Pat. No. 5,409,233 discloses a clear coating for use on a golf ball that incorporates a solvent system that includes methylamyl ketone (MAK).

Previous top coat formulations had the disadvantage that they were preferably used with the addition of a basecoat or primer. The elimination of the basecoat or primer is desirous, since the basecoat increases the cost of manufacturing as well as increases the production time of the golf ball. In addition, the primer or basecoat can be the source of volatile organic compounds (VOC's), that from an environmental standpoint, should be reduced or eliminated from the manufacturing process. Moreover, the presence of the primer coat can deleteriously affect the aerodynamic aspects of the golf ball during flight. The uneven distribution of primer over the cover as well as the pooling of primer within the dimples of the golf ball can alter the flight characteristics of the ball. In those instances where the top coat could be applied directly to the exterior of the cover, the cover had to meet specific chemical requirements such as a high zinc content, or favorable adhesion characteristics.

Consequently, there remains a need for a top coat that requires no basecoat or primer yet exhibits superior bonding to a variety of golf ball cover chemistries while still retaining superior abrasion resistance and durability.

SUMMARY OF THE INVENTION

In a first aspect of the present invention, a golf ball includes an exterior surface surrounded by a polyurethane coating. The polyurethane coating includes a polyester polyol resin containing a neopentyl glycol-based polyol resin, and a polyisocyanate component.

In a second aspect of the invention, a golf ball includes the polyurethane coating according to the first aspect of the invention, wherein the polyisocyanate component is an isocyanurate trimer of toluene diisocyanate.

In a third, separate aspect of the invention, a polyurethane coating comprises a polyol component and a polyisocyanate component. The polyol component includes a mixture of neopentyl glycol resin, silane, aziridine, and a solvent blend including two or more of the solvents selected from the group consisting of ethyl acetate, butyl acetate, propyleneglycolmonomethylether acetate (PM acetate), toluene, or xylene. The polyisocyanate component contains a mixture of an isocyanurate trimer of toluene diisocyanate, a biuret of hexamethylene diisocyanate, and the solvent blend.

Accordingly, it is an object of the present invention to provide a two-component polyurethane top coat that is capable of being applied directly to a variety of substrates. The two-component polyurethane top coat can be applied directly to the exterior surface of a golf ball with a wide range of chemistries without the use of a primer or basecoat. The top coat can be applied and cured in a reasonably short period of time, thus reducing cycle times for the manufacture of balls. The elimination of the primer or basecoat permits greater aerodynamic predictability of the ball's flight characteristics, as well as significantly reduces or eliminates emissions inherent in the primer/basecoat application process. Other and further objects and advantages will appear hereafter.

DETAILED DESCRIPTION OF THE PREFERRED EMBODIMENT

Though the two-component polyurethane top coat of the present invention is suitable for use on a range of different substrates such as wood, plastic, rubber, metal, and the like, the following discussion will focus on the use of the two-component polyurethane top coat on a golf ball. This discussion is for exemplary purposes only, and is not intended to limit the scope of the invention described in the attached claims.

A golf ball generally comprises a one-piece construction or it may include several layers including a core and an outer cover surrounding the core. On the exterior surface of the golf ball is the polyurethane top coat. The polyurethane top coat is applied directly to cover. No basecoat or primer is needed for application of the polyurethane top coat of the present invention. In this way, the deleterious effects of the primer or basecoat can be eliminated.

The exterior surface of the golf ball is preferably made of any number of materials that are based on ionomeric, thermoplastic, elastomeric, urethane, balata (natural or synthetic), polybutadiene or any combination of the above. It has been found that the above listed cover chemistries, when used in connection with the polyurethane top coat of the present invention provides superior direct-to-cover adhesion and abrasion resistance. Adhesion is used to describe the ease to which the top coat bonds to the cover and is required to protect any trademark, lettering, logo or the like that is on the golf ball surface. Abrasion, on the other hand, refers to the ability of a ball to retain and maintain its glossiness in response to weathering and use.

The polyurethane top coat principally includes two components, namely a polyol component and isocyanurate component. According to the present invention, the polyol component preferably comprises a blend of polyester polyol materials containing a polyester polyol resin based on neopentyl glycol. The isocyanurate component preferably comprises a blend of polyisocyanate prepolymers.

A description of the polyol component of the polyurethane top coat now follows. As recited above, the polyol component includes a blend of polyester polyol materials. According to the present invention, contained within this blend of polyester polyol materials is preferably one or more materials based on neopentyl glycol (NPG), and more preferably polyester polyol resins based on neopentyl glycol. The presence of the polyester polyol resins based on neopentyl glycol allows superior adhesion and abrasion resistance for a variety of golf ball materials. Preferably, the NPG resin comprises between about 40% to about 80% on a weight basis of the polyol component of the top coat.

In addition, it is preferable that the polyol component further include an epoxidized silane and a polyfunctional aziridine. The combination of a polyester neopentyl glycol-based polyester polyol(s), silane, and aziridine have been found to result in a superior polyol component with respect to the adhesion, durability, and abrasion resistance of the top coat. A solvent blend is preferably mixed with the polyol component. Additional components of the polyol component can include a thixotropic resin and flow additive.

In the present invention, the solvent blend used in the polyol component of the top coat may comprise two or more of the following at any ratio: ethyl acetate, butyl acetate, propyleneglycolmonomethylether acetate, toluene or xylene.

Table 1 shown below lists on a weight basis the range of the various materials used in the polyol component of the polyurethane top coat.

TABLE 1

Polyol Component

| MATERIAL | PARTS BY WEIGHT |
| --- | --- |
| Solvent Blend | 10.0–50.0 |
| Thixotropic Resin | 1.0–3.0 |
| Flow Additive | 0.1–1.0 |
| Epoxidized Silane | 0.1–1.0 |
| Polyfunctional Aziridine | 1.0–3.0 |
| NPG Resin(s) | 40.0–80.0 |

A description will now be given of the polyisocyanate component of the top coat. According to the present invention, the polyisocyanate component preferably includes an isocyanurate trimer of toluene diisocyanate (TDI) in addition to biuret of hexamethylene diisocyanate (HDI). The presence of TDI improves the drying and curing characteristics of the top coat by decreasing drying time while still offering superior abrasion resistance. Preferably, the ratio (weight basis) of the two resins should be about 50% to about 60% of isocyanurate trimer to about 50% to about 40% hexamethylene diisocyanate based on equivalent weights of functional isocyanate. In addition, a solvent blend is preferably a component of the polyisocyanate component of the polyurethane top coat. The solvent blend used in the polyisocyanate component of the top coat may comprise two or more of the following at any ratio: ethyl acetate, butyl acetate, propyleneglycolmonomethylether acetate, toluene or xylene.

Table 2 shown below lists on a weight basis the range of the various materials used in the polyisocyanate component of the polyurethane top coat.

TABLE 2

Polyisocyanate component

| MATERIAL | PARTS BY WEIGHT |
| --- | --- |
| Solvent Blend | 10.0–30.0 |
| Isocyanurate Trimer of TDI | 40.0–70.0 |
| HDI Biuret | 30.0–50.0 |

Prior to coating the exterior of the golf ball cover, the polyol component and the polyisocyanate component are combined to form the polyurethane top coat. When combining the two components a stoiciometric index ratio of the polyester polyol component to polyisocyanate component should not be less than 1.25:1.00 (NCO:OH) and most preferred within the range of about 1.25 to about 1.50 equivalents of polyisocyanate to 1.00 equivalents polyol. This results in mixing the polyol with the polyisocyanate at ratios (weight basis) ranging from 1:1 up to 5:1, depending on the stoichiometric ratio outlined above.

The two component top coat is applied to the golf ball by any number of methods commonly known in the art. For example, the top coat can be directly applied to golf balls using a spray gun or other atomizing device. After spraying, the balls are then cured by heating the balls at a temperature within the range of about 125 degrees F to about 150 degrees F. At these conditions, the clear top coat is then dry-to-touch and can be handled after ten minutes of baking. Complete curing of the balls results in about 72 to about 144 hours after the initial cure.

Thus, a two component polyurethane top coat is disclosed that can be directly applied to a variety of substrates, i.e., the exterior surface of a golf ball without the aid of a primer or basecoat. The improved top coat exhibits superior adhesion to a variety of exterior surfaces while maintaining a high abrasion resistance. The polyurethane top coat also exhibits excellent drying and curing characteristics, which can decrease the production time of a completed ball.

While embodiments and applications of this invention have been shown and described, it would be apparent to those skilled in the art that many more modifications and substitutions of known equivalents are possible without departing from the scope of the invention. The invention, therefore is not to be restricted except in the spirit of the appended claims.

What is claimed is:

1. A golf ball comprising:

an exterior surface; and a polyurethane coating over the exterior surface, the polyurethane coating including a polyester polyol resin component and a polyisocyanate component, the polyester polyol resin component containing a neopentyl glycol resin, and the polyisocyanate component of the polyurethane coating comprising a mixture containing an isocyanurate trimmer of tolune diisocyanate and biuret of hexamethylene diisocyanate.

2. The golf ball according to claim 1 wherein the polyester polyol resin component and the polyisocyanate component further comprising two or more solvents selected from the group of ethyl acetate, butyl acetate, propyleneglycol-monomethylether acetate, toluene and xylene.

3. The golf ball according to claim 1 wherein the polyester polyol resin component further comprises silane and aziridine.

4. A golf ball comprising:

an exterior surface; and a polyurethane coating over the exterior surface, the polyurethane coating including a polyol component and a polyisocyanate component, the polyol component further including a neopentyl glycol resin, the polyisocyanate component further containing a mixture of an isocyanurate trimer of toluene diisocyanate and a biuret of hexamethylene diisocyanate, the polyol component and the polyisocyanate component further including a solvent blend.

5. A golf ball according to claim 4, the solvent blend is two or more solvents selected from the group consisting of ethyl acetate, butyl acetate, propyleneglycolmonomethylether acetate, toluene, and xylene.

6. A polyurethane coating for use on the exterior of a substrate:

a polyol component including a neopentyl glycol resin; and a polyisocyanate component containing a mixture of an isocyanurate trimer of toluene diisocyanate and a biuret of hexamethylene diisocyanate.

7. A polyurethane coating according to claim 6, the polyol component further including two or more solvents selected from the group consisting of ethyl acetate, butyl acetate, propyleneglycolmonomethylether acetate, toluene, and xylene.

8. A polyurethane coating according to claim 7, the polyol component further including a mixture of silane and aziridine.

9. A polyurethane coating according to claim 8, the polyisocyanate component further including two or more solvents selected from the group consisting of ethyl acetate, butyl acetate, propyleneglycolmonomethylether acetate, toluene, and xylene.

10. A polyurethane coating according to claim 6, wherein the substrate is the exterior surface of a golf ball.

11. A polyurethane coating according to claim 6, the substrate being a material selected from the group consisting of wood, plastic, metal, and rubber.

12. A polyurethane coating for use with golf balls comprising:

a polyol component including a mixture of neopentyl glycol resin, silane, aziridine, and two or more solvents selected from the group consisting of ethyl acetate, butyl acetate, propyleneglycolmonomethylether acetate, toluene, and xylene; and a polyisocyanate component containing a mixture of an isocyanurate trimer of toluene diisocyanate, a biuret of hexamethylene diisocyanate, and two or more solvents selected from the group consisting of ethyl acetate, butyl acetate, propyleneglycolmonomethylether acetate, toluene, and xylene.

* * * * *

UNITED STATES PATENT AND TRADEMARK OFFICE
Certiicate

Patent No. 6,018,012

Patented: January 25, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven C. Crast, Oceanside, CA; Ramon Buella Dineros, Oceanside, CA; and Michael G. Lucero, San Marcos, CA.

Signed and Sealed this Twenty-Eighth Day of November, 2000.

JAMES J. SEIDLECK
*Supervisory Patent Examiner*
Technology Center 1700